United States Patent [19]

Stonecypher, Jr.

[11] Patent Number: 5,908,470
[45] Date of Patent: Jun. 1, 1999

[54] METHOD FOR CONTENTION-FREE ACCESS AND MANAGEMENT OF TIMERS IN MULTIPROCESSING ENVIRONMENTS

[75] Inventor: Thomas Edward Stonecypher, Jr., Columbia, S.C.

[73] Assignee: NCR Corporation, Dayton, Ohio

[21] Appl. No.: 08/775,982

[22] Filed: Jan. 3, 1997

[51] Int. Cl.⁶ .................................................. G06F 1/14
[52] U.S. Cl. .............................................. 713/502; 709/8
[58] Field of Search .................................... 395/557, 677, 395/678

[56] References Cited

U.S. PATENT DOCUMENTS

| | | | |
|---|---|---|---|
| 4,589,093 | 5/1986 | Ippolito et al. | 395/672 |
| 5,694,604 | 12/1997 | Reiffin | 395/677 |
| 5,706,515 | 1/1998 | Connelly et al. | 395/676 |

OTHER PUBLICATIONS

Daniel Glasser—*Efficient Synchronization Techniques for Multithreaded Win32–based Applications*; 1992–1996 Microsoft Corporation; pp. 1–3; MSJ 1995 #2—Feb.— MSDN Library.
*Lesson 4—Multitasking and Multiprocessing*; 1992–1995 Microsoft Corporation; pp. 1–6; Windows NT Training Architectural Overview; Microsoft TechNet—Aug. 1996.
*Critical Section Objects*; 1992–1996 Microsoft Corporation; p. 1; Win32 SDK Programmer's Reference—MSDN Library.
*Synchronization Functions*; 1992–1996 Microsoft Corporation; p. 1; Win32 SDK Programmers's Reference—MSDN Library.
*Initialize Critical Section*; 1992–1996 Microsoft Corporation; p. 1; Win32 SDK Programmer's Reference—MSDN Library.
*Try Enter Critical Section*; 1992–1996 Microsoft Corporation; p. 1; Win32 SDK Programmer's Reference—MSDN Library.
*Enter Critical Section*; 1992–1996 Microsoft Corporation; p. 1; Win32 SDK Programmer's Reference—MSDN Library.
*Get Last Error*; 1992–1996 Microsoft Corporation; p. 1; Win32 SDK Programmer's Reference—MSDN Library.
*Leave Critical Section*; 1992–1996 Microsoft Corporation; Win32 SDK Programmer's Reference—MSDN Library.

*Primary Examiner*—Dennis M. Butler
*Attorney, Agent, or Firm*—Merchant, Gould, Smith, Edell, Welter & Schmidt

[57] ABSTRACT

A method for contention-free access and management of shared timers in a multiprocessing environment allocates at least two timers, which are used by all subject threads in a "ping-pong" manner. Each thread uses a local variable to determine which of the two timers to use for blocking. At initialization, the first timer tracks a first specified time duration and the second timer tracks a second specified time duration after the first specified time duration. When the first timer expires, it is reset by the master thread to expire at a third specified time duration after the second specified time duration. Similarly, when the second timer expires, it is reset by the master thread to expire at a fourth specified time duration after the third specified time duration. This process repeats itself, so that a timer is always active in the system. Following timer expiration, the non-master threads and the master thread perform processing tasks, and then block on a timer without contention or additional synchronization.

15 Claims, 2 Drawing Sheets

METHOD FOR CONTENTION-FREE ACCESS AND MANAGEMENT OF TIMERS IN MULTIPROCESSING ENVIRONMENTS

BACKGROUND OF THE INVENTION

1. Field of the Invention.

The present invention generally relates to contention-free access and management in multiprocessing software environments. In particular, the invention provides contention-free access to timer objects in a multiprocessing environment.

2. Description of Related Art.

A common operation in computer software is the scheduling of work to be performed at some time in the future, such as 10 milliseconds from the current time. Typically, this is accomplished by the use of a timer object. The operating system provides the timer object and the timer object schedules work by keeping track of elapsed time.

In the general case, the software using the timer performs a sequence of steps. The software first requests a timer object from the operating system. The software initializes the timer object, specifying the duration before the timer expires. The software then waits, or "blocks", on the timer object until the time duration has elapsed. When the operating system determines that the specified duration has elapsed, the previously blocked software performs its defined tasks.

In multithreaded, multiprocessing, or multiprogrammed environments, it often happens that there is a need to schedule work to be performed by a plurality of threads, processes, or jobs at some time in the future. If the threads are intended to block for the same duration of time, the threads may block on the same timer object, thereby reducing resource consumption and processing overhead. However, management of the shared timer may be costly, since ordinarily each thread will contend for access to the timer object and re-initialize it for the next timer interval. Notably, many of the traditional shared-timer management techniques are costly, including the "mutex and master thread" approach; the "mutex: first thread in initializes the timer" approach; and the "spinlock" approach (in multiprocessing systems).

In the "mutex and master thread" approach, a mutex is a synchronization object that ensures exclusive access to a resource. Other threads requesting the mutex have to wait until the mutex is signaled. The master thread is responsible for initializing the timer.

The master thread follows the procedure outlined below. First, it initializes the timer with the next duration and signals the operating system mutex, allowing all threads to run. The non-master threads may now block on the timer. After all non-master threads have gotten through the mutex, then the master thread resets the mutex so that any further waiting threads will block. If a thread is not a master thread, then it skips the above procedure and waits on the mutex.

In the "mutex: first thread in initializes the timer" approach, the first thread has the responsibility for setting the timer. The first thread acquires the operating system mutex and determines whether the timer is already set. If the timer is set, the first thread releases the mutex. Otherwise, the first thread initializes the timer and then releases the mutex. In either case, the thread subsequently blocks on the timer.

In the "spinlock" approach (in multiprocessing systems), a spinlock variable is associated with the timer. A thread attempts to acquire the spinlock variable, using an interlocked test and set operation. After acquiring the spinlock variable, the thread then determines whether the timer has been set. If the timer has not been set, the thread initializes the timer and releases the spinlock variable. In either case, it blocks on the timer object.

One problem with these traditional approaches is that they require a large amount of processing overhead because each thread must contend for exclusive to the timer. Additionally, these methods increase the elapsed time of the operation, since each thread must wait (either spinning or blocking) until it acquires exclusive access to the timer object.

Thus, because of the processing overhead of traditional methods, there is a need for an invention that eliminates the contention for timer-objects and the need for synchronization mechanisms and subsequent wait times.

SUMMARY OF THE INVENTION

To overcome the limitations in the prior art described above, the present invention discloses a method and apparatus for contention-free access and management in multiprocessing software environments. The present invention allocates at least two timers, which are used in a "ping-pong" manner. A variable in the computer memory, local to each subject thread and maintained separately by each thread, is used to identify which timer is the active timer. Each thread uses this variable to determine which of the two timers to use for blocking.

At initialization, the first timer tracks a first specified time duration and the second timer tracks a second specified time duration after the first specified time duration. When the first timer expires, it is reset by the master thread to expire at a third specified time duration after the second specified time duration. Similarly, when the second timer expires, it is reset by the master thread to expire at a fourth specified time duration after the third specified time duration. This process repeats itself, so that a timer is always active in the system.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention provides a method for contention-free access and management of shared timers in multi-threaded software. The invention ensures that there is always an active timer object ready for one or more threads to block on. In the invention, no contention on timers or other variables exists and the invention eliminates the overhead from synchronization mechanisms.

Indeed, the impact of the invention is on processing overhead. Overhead is reduced by eliminating contention and synchronization, and by doing all this while still allowing the use of a shared timer object (which reduces processing and memory resources).

The invention uses a technique known as "ping-pong" timers for shared-timer management. In this invention, each thread's processing work is completed and the thread is blocked on one of the timers before the timer expires. As long as this condition is met, no threads will ever miss a timer-expiration event.

There are some very useful applications that satisfy this constraint, such as real-time software and performance monitoring software. Performance monitoring software will often run at the highest priority and perform minimal work per timer period in order to minimize its impact on the system. A typical performance monitoring driver will sample a few counters per timer period, then go back to block on the timer again.

The requirement that the work performed by a thread be of shorter duration than the timer period may be relaxed under some conditions. If the correctness of the application's functions do not depend on the thread seeing each timer-expiration event, the invention will be entirely appropriate.

Hardware Environment

Figure 1:
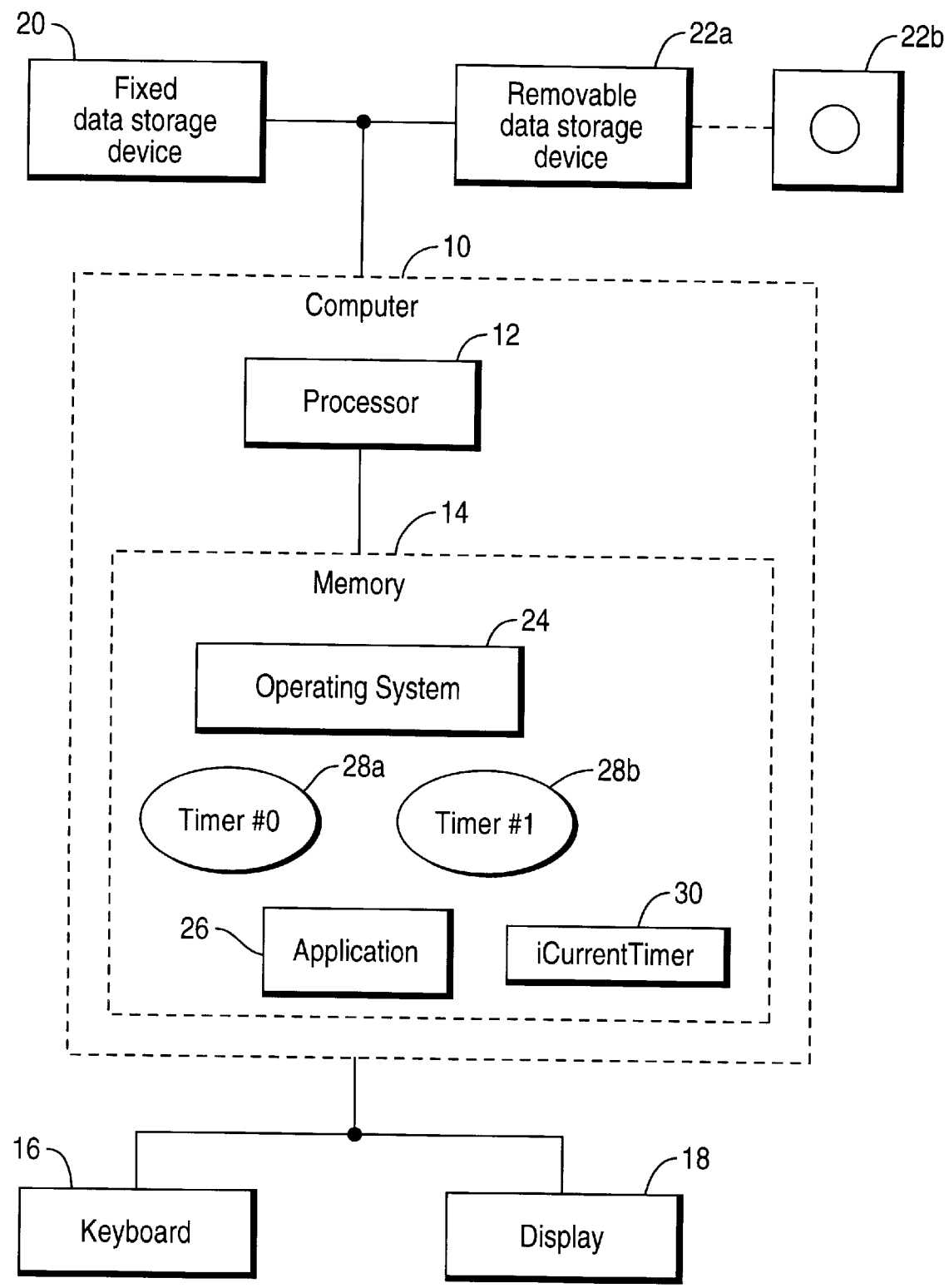
FIG. 1 is a block diagram that illustrates an exemplary hardware environment of the present invention.

FIG. 1 is a block diagram that illustrates an exemplary hardware environment of the present invention. The present invention is typically implemented using a computer 10 comprised of one or more processors 12, random access memory (RAM) 14, and other components. It is envisioned that attached to the computer 10 may be a keyboard 16, display 18, fixed data storage devices 20 and/or removable data storage devices 22a and their associated media 22b. Those skilled in the art will recognize that the exemplary environment illustrated in FIG. 1 is not intended to limit the present invention. Indeed, those skilled in the art will recognize that other alternative hardware environments may be used without departing from the scope of the present invention.

The computer 10 operates under the control of an operating system 24, such as Windows™, Macintosh™, or UNIX™ operating systems. In addition, the computer 10 executes one or more multi-threaded drivers or software applications 26 that use one or more timer objects 28a–b under the control of the operating system 24. The software application 26 uses an iCurrentTimer variable 30 to identify a current or active timer 28a–b.

Generally, the operating system 24, the software application 26, the timer objects 28a–b and the iCurrentTimer variable 30 are tangibly embodied in a computer-readable medium, e.g., one or more of the fixed and/or removable data storage devices 20 and 22. The operating system 24, software application 26, timer objects 28a–b, and iCurrentTimer variable 30 may be loaded from the data storage devices 20 and 22 into the random access memory 14 of the computer 10 for execution by the microprocessor 12. The operating system 24 and software application 26 both comprise instructions which, when read and executed by the microprocessor 12 of the computer 10, causes the computer 10 to perform the steps necessary to execute the steps or elements of the present invention.

Contention-Free Access to Shared Timers

The present invention discloses a technique for contention-free management of shared timers in the multi-threaded application software 26. The present invention allocates at least two timers, timer 28a (also known as timer #0) and timer 28b (also known as timer #1), in the memory 14 of the computer 10. These timers 28a–b are used by the multi-threaded application software 26 in a "ping-pong" manner.

The iCurrentTimer variable 30 is allocated in the memory 14 of the computer 10 and stores a value that identifies which timer 28a–b is currently active. This iCurrentTimer variable 30 is local to each subject thread and maintained separately by each thread of the software application 26. Each thread of the software application 26 uses the iCurrentTimer variable 30 to determine which of the two timers 28a–b to use for blocking.

At initialization, the first timer 28a tracks a first specified time duration and the second timer 28b tracks a second specified time duration after the first specified time duration. When the first timer 28a expires, it is reset by the master thread of the software application 26 to expire at a third specified time duration after the second specified time duration. Similarly, when the second timer 28b expires, it is reset by the master thread of the software application 26 to expire at a fourth specified time duration after the third specified time duration. This process repeats itself, so that a timer 28a–b is always active for the threads of the software application 26.

The general logic of the software application 26 in accordance with the present invention can be described by the following steps:

1. Initialize n to 0 and initialize an array duration(1:?) with the desired duration periods. It is assumed that the array duration (1:?) is of sufficient size to account for a total time duration, or otherwise cycles (along with the counter n) so that the duration periods therein are reused.
2. Set the duration of timer #0 to duration(0).
3. Set the duration of timer #1 to duration(0) + duration (1).
4. Set iCurrentTimer to 0.
5. All threads of the software application 26 block on the timer 28a–b identified by the local iCurrentTimer variable 30 and are re-activated when the timer 28a–b expires.
6. If the re-activated thread is the designated master thread of the software application 26, then it resets the timer 28a–b identified by the iCurrentTimer variable 30 (i.e., the timer 28a–b that just expired) by invoking functions provided either by the operating system 24 and/or the software application 26 for initializing and scheduling the timers 28a–b. The timer 28a–b is reset with a duration period equal to duration(n+1)+duration(n+2), and n is incremented by 1. No threads block on this timer 28a–b yet.
7. Do whatever work is to be performed in this thread.
8. Each thread sets its value of the iCurrentTimer variable 30 to the value of (iCurrentTimer+1) mod 2. This switches to the other timer 28a–b for blocking. Note that the iCurrentTimer variable 30 is local to each thread of the software application 26, so no synchronization is required.
9. Go back to step 5.

In the above method, steps 1 to 3 are one-time initialization steps, performed prior to any thread executing the loop. Each of the blocking threads executes steps 4 through 9, possibly in parallel.

Note that there are many alternative embodiments for specifying the duration periods. Such alternative embodiments may eliminate the need for the counter n and the array duration(1:?) described above.

For example, where the duration period is constant (e.g., duration=d), the method of the present invention may be simplified, as indicated in the following steps:

1. Set the duration of timer #0 to d.
2. Set the duration of timer #1 to d*2.
3. Set the iCurrentTimer variable 30 to 0.
4. All threads of the software application 26 block on the timer 28a–b identified by the iCurrentTimer variable 30, and are re-activated by the operating system when the timer 28a–b expires.
5. If the re-activated thread is the master thread of the software application 26, then reset the timer 28a-b identified by the iCurrentTimer variable 30 (i.e., the timer 28a–b that just expired) by invoking functions provided by the operating system 24 and/or the software application 26 for initializing and scheduling timers 28a–b. The timer 28a–b is reset with a duration period equal to d*2. No threads block on this timer 28a–b yet.
6. Do whatever work is to be performed in this thread.
7. Set the iCurrentTimer variable 30 to a value equal to (iCurrentTimer+1) mod 2. This switches to the other timer 28a–b for blocking.
8. Go back to step 4.

Steps 1 to 2 above are one-time initialization steps, performed prior to any thread executing the loop. All of the blocking threads execute steps 3 through 8, possibly in parallel.

Another alternative embodiment could have two duration periods, wherein each duration period is constant for its associated timer. In this embodiment, the timer 28a–b is always reset with a duration period equal to duration(0) +duration(1).

Implementation

Figure 2:
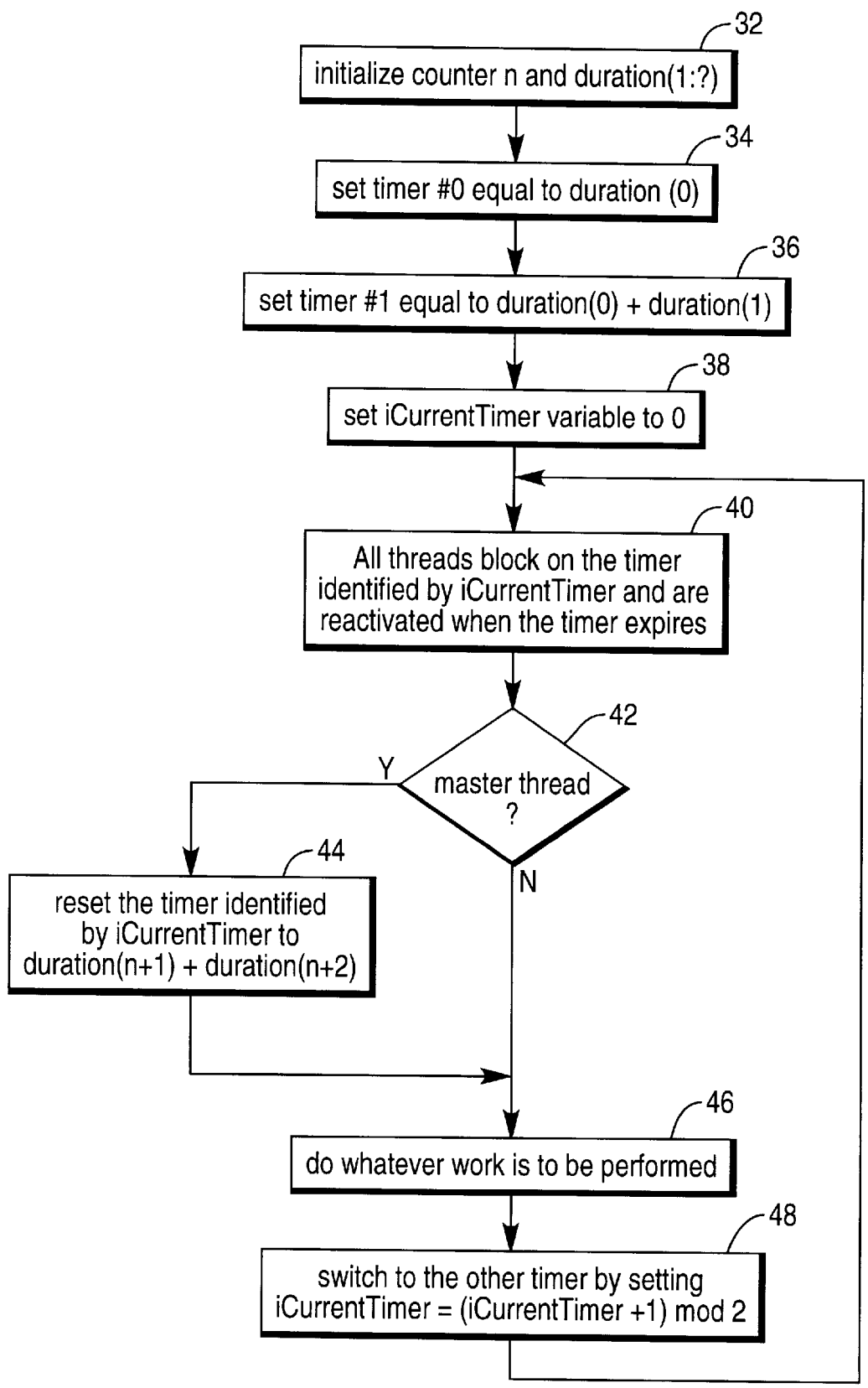
FIG. 2 is a flowchart illustrating the logic performed in accordance with the present invention.

FIG. 2 is a flowchart illustrating the logic performed in accordance with the present invention.

Block 32 represents the software application 26 initializing a counter n to 0 and an array duration(1:?) with the desired duration periods.

Block 34 represents the software application 26 initializing the first timer 28a, timer #0, with a duration period equal to duration(0).

Block 36 represents the software application 26 initializing the second timer 28b, timer #1, with a duration period equal to duration(0) +duration(1).

Block 38 represents the software application 26 initializing the iCurrentTimer variable 30 to the value 0. In this example, the value of the iCurrentTimer variable 30 is limited to either 0 or 1 and identifies one of the timers 28a–b.

Block 40 represents the blocking behavior of the threads of the software application 26. In particular, all threads of the software application 26 block on the timer 28a–b identified by the value in the iCurrentTimer variable 30, and are re-activated when the timer 28a–b expires.

Block 42 is a decision block that represents the software application 26 determining whether the re-activated thread is the designated master thread. If so, control transfers to Block 44; otherwise, control transfers to Block 46.

Block 44 represents the master thread of the software application 26 initializing the timer 28a–b identified by the iCurrentTimer variable 30 (i.e., the timer 28a–b that just expired) by invoking functions in the operating system 24 and/or the software application 26 for initializing and scheduling timers 28a–b. The master thread of the application software 26 specifies the duration period of the identified timer 28a–b as equal to duration(n+1) +duration(n+2), and the counter n is incremented by 1. No threads block on the timer 28a–b yet.

Block 46 represents the threads of the software application 26 doing their defined tasks.

Block 48 represents the threads of the software application 26 switching to the other timer 28a–b. The switch occurs by setting the iCurrentTimer variable 30 to a value equal to (iCurrentTimer +1) mod 2. Thereafter, control transfers back to Block 40.

Conclusion

This concludes the description of the preferred embodiment of the invention. In summary, the present invention discloses a method, apparatus and article of manufacture for contention-free access and management of timers in a multiprocessing environment allocates at least two timers, which are used in a "ping-pong" manner. Each thread separately maintains a local variable in the computer memory to identify which timer is the active timer. Each thread uses this variable to determine which of the two timers to use for blocking. At initialization, the first timer tracks a first specified time duration and the second timer tracks a second specified time duration after the first specified time duration. When the first timer expires, it is reset by the master thread to expire at a third specified time duration after the second specified time duration. Similarly, when the second timer expires, it is reset by the master thread to expire at a fourth specified time duration after the third specified time duration. This process repeats itself, so that a timer is always active in the system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for contention-free management of shared timers in a multiprocessing computer environment, comprising the steps of:
    (a) initializing a first timer in a memory of a computer by specifying a first duration period therefor;
    (b) initializing a second timer in the memory of the computer by specifying a second duration period therefor;
    (c) initializing a timer identifier for every thread in the memory of the computer to designate either the first timer or the second timer as a current timer;
    (d) blocking execution of one or more threads by the computer on the current timer, wherein one of the threads is designated as a master thread;
    (e) re-activating the blocked threads when the current timer expires;
    (f) re-setting the current timer within the master thread by specifying a new duration period therefor;
    (g) performing one or more other functions within each of the re-activated threads;
    (h) updating the timer identifier to designate the other of the first timer or second timer as the current timer;
    (i) repeating steps (d) through (h).

2. The method of claim 1 above, wherein the duration periods for the first and second timers varies.

3. The method of claim 1 above, wherein the duration periods for the first and second timers are constant.

4. The method of claim 1 above, wherein the duration periods for the first and second timers are identical.

5. The method of claim 1 above, wherein the duration periods for the first and second timers are different.

6. An apparatus for contention-free management of shared timers in a multiprocessing computer environment, comprising:

(a) a computer with a memory;

(b) means, performed by the computer, for performing the following steps:

(1) initializing a first timer in the memory of the computer by specifying a first duration period therefor;

(2) initializing a second timer in the memory of the computer by specifying a second duration period therefor;

(3) initializing a timer identifier in the memory of the computer to designate either the first timer or the second timer as a current timer;

(4) blocking execution of one or more threads by the computer on the current timer, wherein one of the threads is designated as a master thread;

(5) re-activating the blocked threads when the current timer expires;

(6) re-setting the current timer within the master thread by specifying a new duration period therefor;

(7) performing one or more other functions within each of the re-activated threads;

(8) updating the timer identifier to designate the other of the first timer or second timer as the current timer;

(9) repeating steps (4) through (8).

7. The apparatus of claim 6 above, wherein the duration periods for the first and second timers varies.

8. The apparatus of claim 6 above, wherein the duration periods for the first and second timers are constant.

9. The apparatus of claim 6 above, wherein the duration periods for the first and second timers are identical.

10. The apparatus of claim 6 above, wherein the duration periods for the first and second timers are different.

11. An article of manufacture comprising a program storage device, readable by a computer, tangibly embodying one or more instructions executable by the computer to perform a method for contention-free management of shared timers in a multiprocessing computer environment, the method comprising the steps of:

(a) initializing a first timer in a memory of a computer by specifying a first duration period therefor;

(b) initializing a second timer in the memory of the computer by specifying a second duration period therefor;

(c) initializing a timer identifier in the memory of the computer to designate either the first timer or the second timer as a current timer;

(d) blocking execution of one or more threads by the computer on the current timer, wherein one of the threads is designated as a master thread;

(e) re-activating the blocked threads when the current timer expires;

(f) re-setting the current timer within the master thread by specifying a new duration period therefor;

(g) performing one or more other functions within each of the re-activated threads;

(h) updating the timer identifier to designate the other of the first timer or second timer as the current timer;

(i) repeating steps (d) through (h).

12. The method of claim 11 above, wherein the duration periods for the first and second timers varies.

13. The method of claim 11 above, wherein the duration periods for the first and second timers are constant.

14. The method of claim 11 above, wherein the duration periods for the first and second timers are identical.

15. The method of claim 11 above, wherein the duration periods for the first and second timers are different.

* * * * *